Nov. 23, 1943.     C. LING     2,335,127
PROCESS AND APPARATUS FOR PHOTO SCULPTURE
Filed July 23, 1941     4 Sheets-Sheet 2
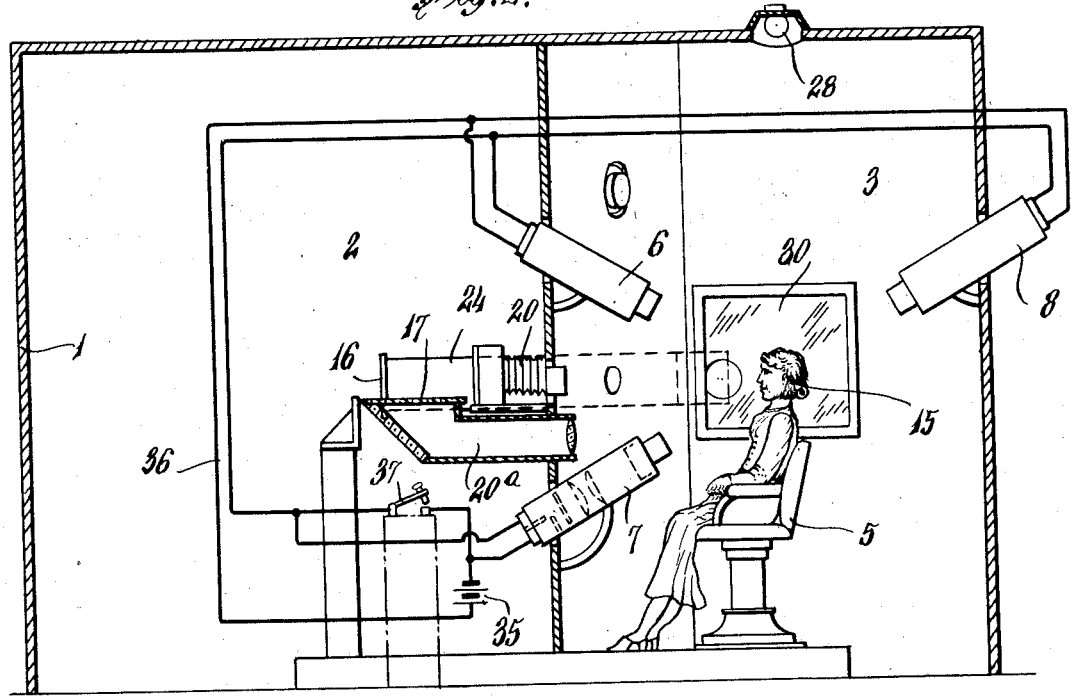
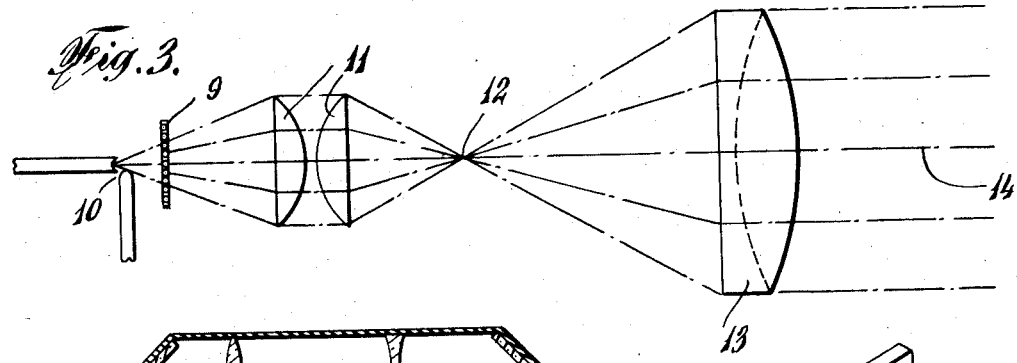
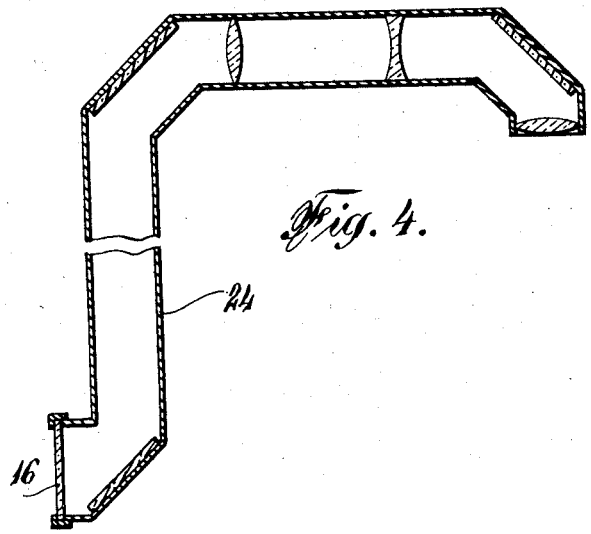
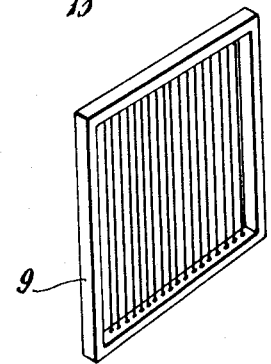
INVENTOR
*Chung Ling*
BY
*Abraham Aaron*
ATTORNEY Patented Nov. 23, 1943

2,335,127

UNITED STATES PATENT OFFICE 2,335,127

PROCESS AND APPARATUS FOR PHOTO SCULPTURE

Chung Ling, New York, N. Y.

Application July 23, 1941, Serial No. 403,643

15 Claims. (Cl. 88—24)

The invention relates to photo sculpture and had for its object to project, through vertical wire screens in projectors, lines on the subject to be reproduced and to photograph said subject from the front and sides to form negatives showing the surface contour lines which may be enlarged and cut out in the form of templates of a thickness equal to the distance of the lines from each other in the enlargement. The templates are adapted to be superimposed and filled in with wax so a mould may be taken therefrom for moulding and reproduction purposes.

A further object is to control the projectors and cameras from a central position, so that the apparatus may be operated by one single person.

A further object is to provide a system of accurate sculptural reproduction photographically whereby three dimension objects may be accurately reproduced without distortion of the contour of the object.

With the above and other objects in view the invention resides in the combination and arrangement of parts as hereinafter set forth, shown in the drawings, described and claimed, it being understood that changes in precise embodiment of the invention may be made within the scope of what is claimed without departing from the spirit of the invention.

In the drawings:

Figure 2 is a vertical transverse sectional view through the cabinet and apparatus.

Figure 3 is a diagrammatic view showing the optical system for producing parallel rays on the subject.

Figure 4 is a sectional view longitudinally through the refraction tube.

Figure 5 is a detail perspective view of the screen.

Figure 1:
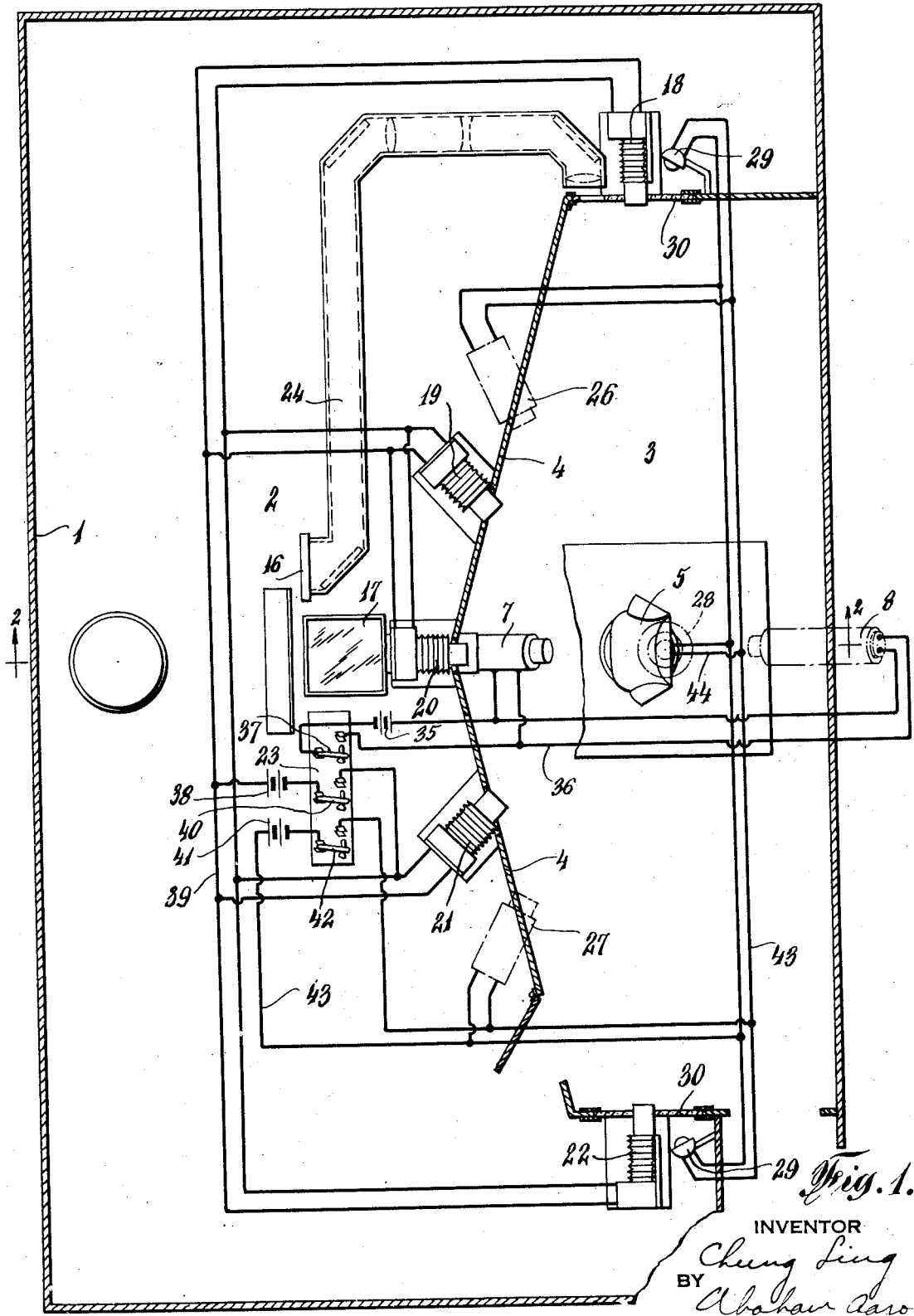
Figure 1 is a horizontal sectional view through a photographic cabinet, showing in top plan, the apparatus therein.

Referring to the drawings, the numeral 1 designates a cabinet or room, 2 the control compartment thereof and 3 the photographic compartment. The photographic compartment 3 is divided from the control compartment 2 by means of vertically disposed converging walls 4, as shown in Figure 1. Disposed within the compartment 3 is a revolving chair 5 in which the subject sits, and this chair is adjusted to a proper position in relation to the line projectors and cameras hereinafter set forth.

The device employs three parallel ray projectors 6, 7 and 8, each projecting 70 to 200 equidistant lines and beams from a strong light source through parallel wire screens 9, shown in Figure 5. The optical system of these projectors is shown in Figure 3 wherein 10 indicates the spot light source which projects rays through the screen 9 through condensers 11, where the point of convergence lies on the principal focal point 12 of the twelve inch diameter achromatic converging lens 13 from which these rays are converged into parallel rays 14 and pass to the head of the subject as shown at 15 Fig. 2. These projectors are set in the same vertical plane and at their respective angles so that when their parallel light cones are intercepted, the projected lines and light beams of each projector coincide with the other. The head of the subject is adjusted to this intercepted position so that the shadows of the sitters projected parts thrown by the upper projector 6 will be overlapped by the rays of the lower projector 7 and at the same time the images form through the trans-refraction tube 24 and the front reflecting camera 20a without films for viewing the subject coinciding with the outlines of the profile and front view of an average person, previously drawn on the two ground glass plates 16 and 17.

After the above operation the subject is then photographed with a set of five cameras, simultaneously, with the time of one twenty-fifth to one one-hundredth of a second. These cameras are fixed on the same horizontal plane and in such a position that the optical axis of each camera passes through one single point as shown in Figure 1. These cameras are designated by the numerals 18, 19, 20, 21, and 22. The angles of the camera positions are also so set that the central camera 20 is exactly perpendicular to and bi-sects the distance between cameras 18 and 22. Cameras 19 and 21 are forty-five degrees relative to the other cameras and equi-distance from each other from the intercepting point of their optical axis. The center lines from the three parallel ray projectors are adjusted to fall vertically on the vertical axis of the central camera 20.

The winding of the shutters of the cameras; the change of exposed films or plates; the adjustment of the chair are operated by remote control, close to the position of the operator at the control panel 23, clearly shown by the circuit in Figure 1. The chair is adjustable in all directions so that subject can be shifted to the right position at will. These mechanisms are schematically illustrated in connection with the circuits in Figure 1. The meaning of the right position here referred to is when both cheeks of the subject are on the optical axis of the cameras 18 and 22. The operator can easily shift the subject by steering the chair in the direction he likes until the profile and front images of the subject is reflected on the ground glass 16 through the trans-refraction tube 24, and the front reflecting camera 20a.

Figure 7:
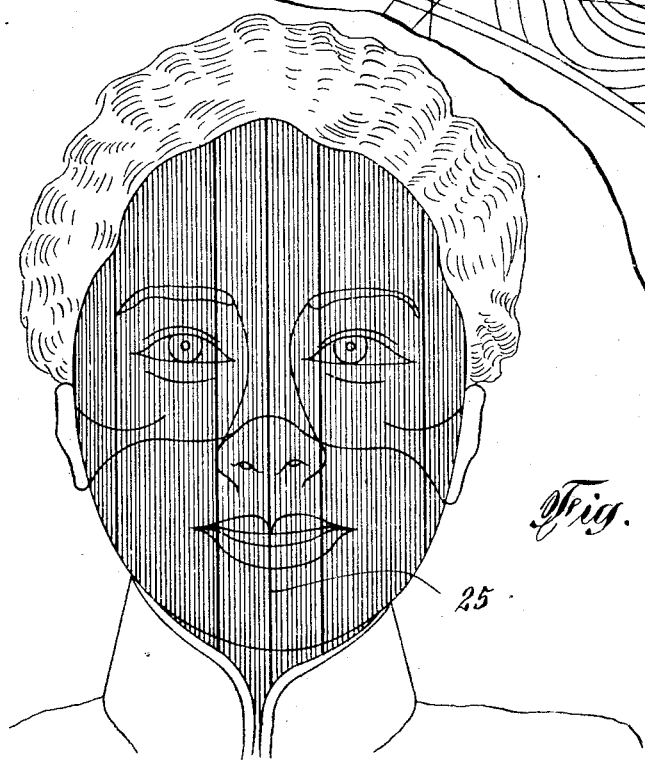
Figure 7 is a front view showing the ray lines as they appear on the negative taken by the front camera.

Before photographing the operator further swings the chair until the center line of the projectors bi-sects the facial plans of the subject as shown at 25, Figure 7. In the screen the center lines are a little larger so the subject can be properly centered. At this juncture the operator may photograph the subject or he may choose to wait until he catches the best mood of the subject's emotions.

Figure 6:
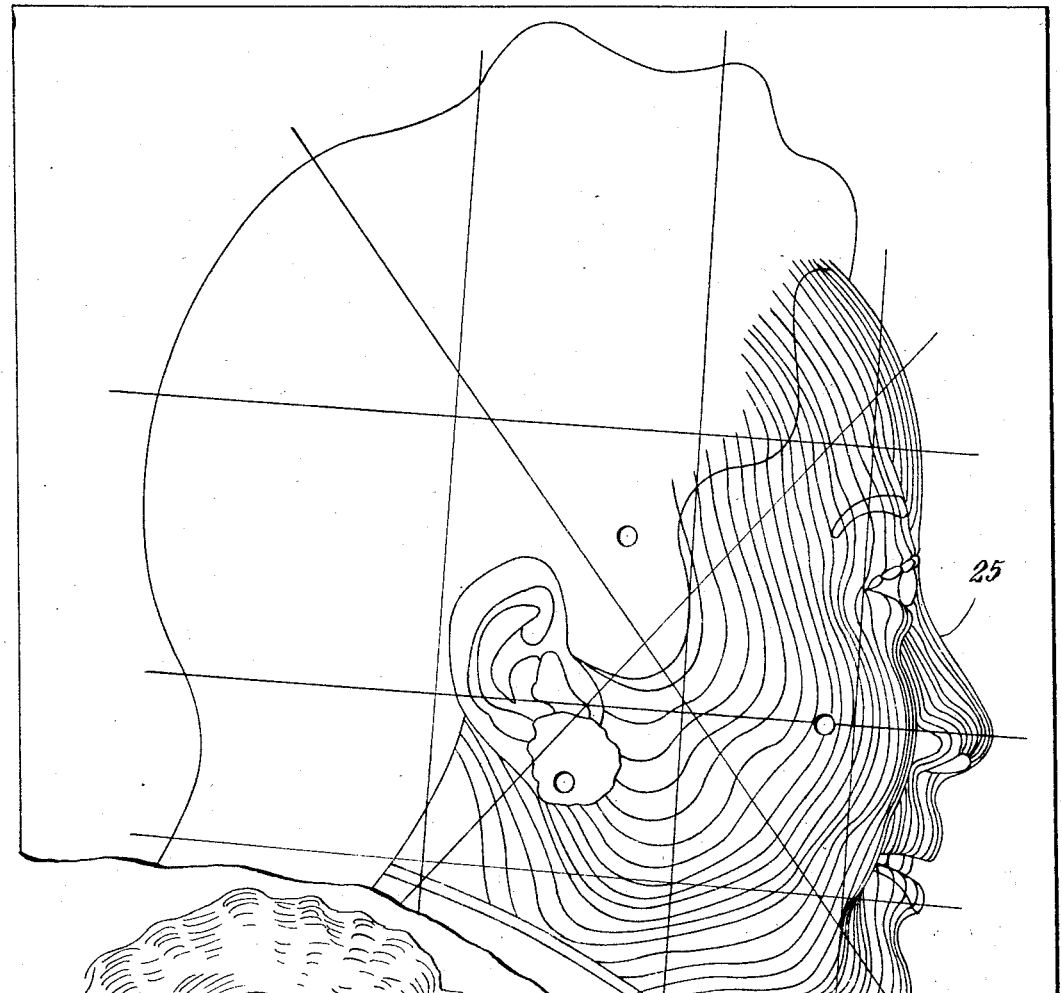
Figure 6 is one of the negatives taken by one of the side cameras showing the parallel rays or lines following the surface contours of the subject.
Figure 8:
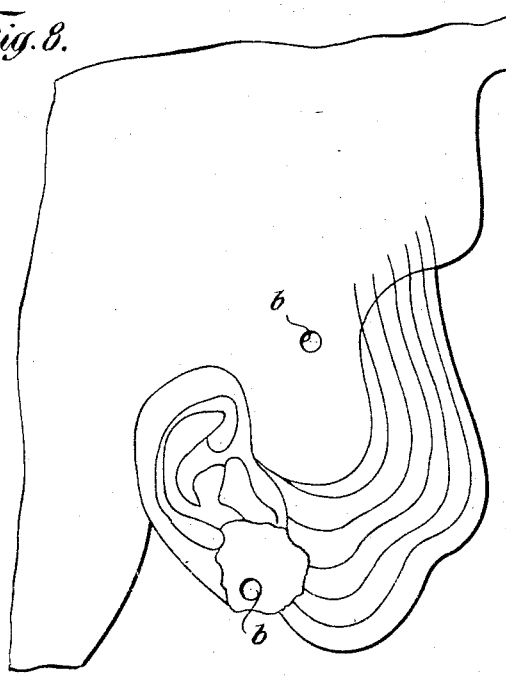
Figure 8 is a plan view showing a partial assembly of the cut out segments or templates from the side negative after the enlargement thereof.
Figure 9:
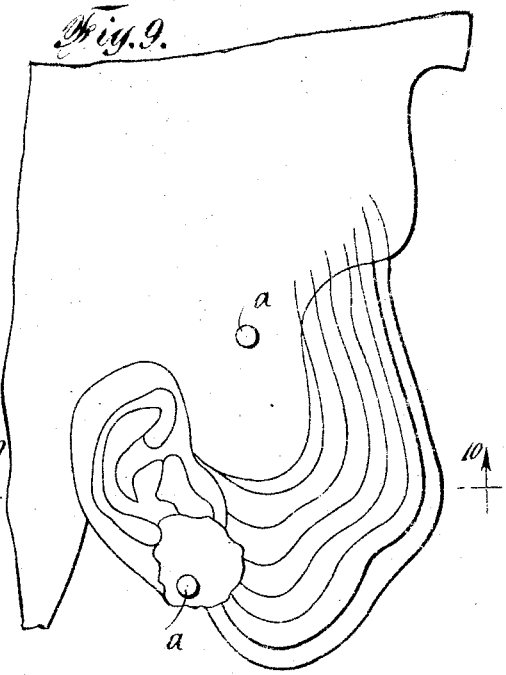
Figure 9 is a view similar to Figure 8 showing profile sections in superimposed accurate relation.
Figure 11:
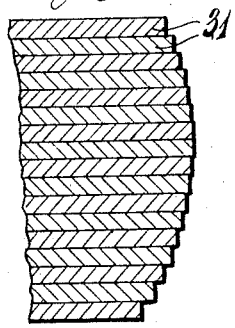
Figure 11 shows a horizontal section through a plurality of profile members.
Figure 12:
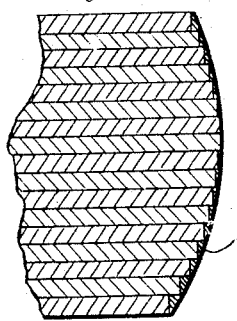
Figure 12 is a view similar to Figure 11 but showing the channels formed by the profile members filled in with a plastic for forming a continuous surface preparatory to the making of a mould.
Figure 10:
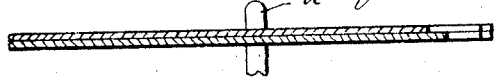
Figure 10 is a horizontal section taken on line 10—10 of Figure 9.
Figure 13:
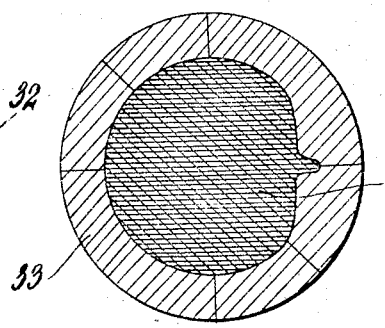
Figure 13 is a horizontal section through the assembled profile members showing the formation of the mould.
Figure 14:
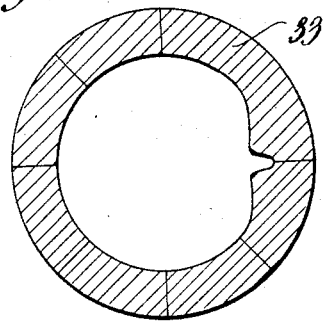
Figure 14 is a horizontal section through the mould.
Figure 15:
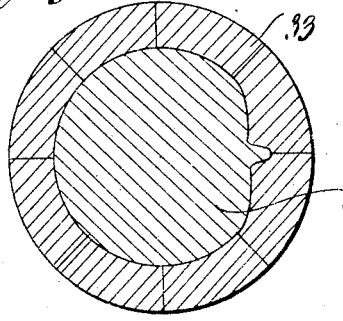
Figure 15 is a horizontal sectional view through the mould and the sculpture formed therein.
Figure 16:
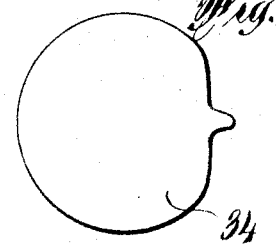
Figure 16 is a top plan view of the reproduced moulded article.

Following the above operation a set of plain pictures are taken by utilizing the side projectors 26 and 27 and the ceiling lamp 28, Figure 2. The two side lamps 29, which project through ground glass 30 serve as lighted backgrounds for the two side plain pictures referred to. These pictures, an example given, later serve the purpose for reconstructing the hairs and eyes of the subject, as such black parts do not reflect the parallel lines, therefore can not be rebuilt by photographic means. The line negatives, when taken, are enlarged to a considerable size so that the curves of the two side photographs, for instance shown in Figure 6, may be clearly traced and duplicated on two sheets of transparent paper, and each outline is numbered in its consecutive order, using the two forty-five degree oblique pictures as guides for numbering. These two sheets are rephotographed, enlarged to the desired size of the subject to be made on two very thin sensitive papers, rendered transparent and later serve as negatives for the number of prints corresponding to the number of outlines. These prints are next pasted on heavy cardboard, the thickness of which is made equal to the distance between any two lines of the front line picture, Figure 7. The two pins a as shown in Fig. 9 are locating pins for templates which have holes B to place templates in position as shown in Fig. 8.

This front view is an enlargement in exact proportion with the profile prints. Each individual outline is then cut from a piece of pasteboard following their consecutive numbers, and at the end of this operation the operator has a number of curiously shaped plates, each representing its own corresponding outline, actually formed on the contour of the subject's face in conjunction with the parallel line projections. The plates are now assembled in their proper order, as shown in Figures 8 to 12 inclusive, and these plates designated by the numerals 31. The plates or profiles are adhesively joined in the order of their numbering and when completed we have for the first time an accurate image of the subject entirely rebuilt from photographic records. At this stage the surface is smooth with a composition of wax, shown at 32. This done, a clay, plastic, or gypsum mould 33 is taken from the reproduced sculpture and any number of copies may be made as shown at 34.

The line projectors 6, 7 and 8 are controlled from a source of power 35 through the circuit 36 and the switch 37 on the control panel 23. The cameras 18, 19, 20, 21 and 22 are controlled from the source of power 38 and circuit 39 by a control switch 40 on the panel 23, while the projectors 26 and 27 are controlled from the source of power 41 through the control switch 42 and circuit 43. This circuit also controls the lights 29 through the circuit 43 and the revoluble object chair 5 through circuit 44.

From the above it will be seen that a method and system is provided while reproducing sculptural objects, which in the finished product will have the exact contour of the reproduced article, and the built up core may be repeatedly used for forming additional moulds if desired. At the same time the subject may be enlarged or reduced. It will also be seen that the complete record of any facial expression is taken simultaneously with the time speed of a fraction of a second, therefore instantaneous impression of human emotion can be recorded and later reproduced into a solid form.

The invention having been set forth what is claimed as new and useful is:

1. A method of sculptural reproduction photographically which comprises projecting a plurality of light rays through screens to provide parallel projected lines and light beams, projecting said rays all in the same vertical plane and at different angles to the horizontal so that at the point of interception of the various angularly projected light beams and lines all of the coincident projected lines and light beams will coincide, placing the object to be reproduced at the point of interception of the projected lines and light rays, adjusting the position of the object to be reproduced so that shadows of projecting parts of the object produced by the downwardly angled light rays will be overlapped by the upwardly projected light rays, photographing said object from different angles and thereby producing negatives with the projected lines thereon, making photographic patterns from said negatives, making plates from said patterns having the line contours of the object as provided on the pattern, and finally assembling the plates to reproduce the object.

2. A method of sculptural reproduction photographically which comprises projecting a plurality of light rays through screens to provide parallel projected lines and light beams, projecting said rays all in the same vertical plane and at different angles to the horizontal so that at the point of interception of the various angularly projected light beams and lines all of the coincident projected lines and light beams will coincide, placing the object to be reproduced at the point of interception of the projected lines and light rays, adjusting the position of the object to be reproduced so that shadows of projecting parts of the object produced by the downwardly angled light rays will be overlapped by the upwardly projected light rays, photographing said object from different angles and thereby producing negatives with the projected lines thereon, making photographic patterns from said negatives, making plates from said patterns having the line contours of the object as provided on the patterns, assembling the plates to reproduce the object, and smoothing the outer surface of the assembled plates by filling the crevices in the assembled reproduced article with a suitable filler.

3. A method of sculptural reproduction photographically which comprises projecting a plurality of light rays through screens to provide parallel projected lines and light beams, projecting said rays all in the same vertical plane and at different angles to the horizontal so that at the point of interception of the various angularly projected light beams and lines all of the coincident projected lines and light beams will coincide, placing the object to be reproduced at the point of interception of the projected lines and light rays, adjusting the position of the object to be reproduced so that shadows of projecting parts of the object produced by the downwardly angled light rays will be overlapped by the upwardly projected light rays, photographing the object from a central direct frontal position and from different angles, regulating said projected light rays so that the centerlines of the projected rays fall vertically on the vertical center of the central frontal photographing position, making photographic patterns from the negatives produced by photographing the object, making plates from said patterns having the line contours of the object as provided on the pattern, and finally assembling the plates to reproduce the object.

4. A method of sculptural reproduction photographically which comprises projecting a plurality of light rays through screens to provide parallel projected lines and light beams, projecting said rays all in the same vertical plane and at different angles to the horizontal so that at the point of interception of the various angularly projected light beams and lines all of the coincident projected lines and light beams will coincide, placing the object to be reproduced at the point of interception of the projected lines and light rays, adjusting the position of the object to be reproduced so that shadows of projecting parts of the object produced by the downwardly angled light rays will be overlapped by the upwardly projected light rays, photographing the object from a central direct frontal position and from different angles, regulating said projected light rays so that the centerlines of the projected rays fall vertically on the vertical center of the central frontal photographing position, making photographic patterns from the negatives produced by photographing the object, making plates from said patterns having the line contours of the object as provided on the pattern, and finally assembling the plates to reproduce the object, backlighting the object from each side, and photographing the object from each side to provide negatives showing the hair lines of the object.

5. A method of sculptural reproduction photographically which comprises projecting a plurality of light rays through screens to provide parallel projected lines and light beams, projecting said rays all in the same vertical plane and at different angles to the horizontal so that at the point of interception of the various angularly projected light beams and lines all of the coincident projected lines and light beams will coincide, placing the object to be reproduced at the point of interception of the projected lines and light rays, adjusting the position of the object to be reproduced so that shadows of projecting parts of the object produced by the downwardly angled light rays will be overlapped by the upwardly projected light rays, photographing said object from different angles and thereby producing negatives with the projected lines thereon, removing said projected light rays from the object, backlighting said object from each side and lighting it from above by unobstructed light rays, photographing the object to produce plain negatives corresponding to the lined negatives previously taken, making photographic patterns from the lined negatives, making plates from said patterns having the line contours of the object as provided on the pattern, finally assembling the plates to reproduce the object and using the plain negatives to reproduce the hair and eyes of the object.

6. A method of sculptural reproduction photographically which comprises projecting a plurality of light rays through screens to provide parallel projected lines and light beams, projecting said rays all in the same vertical plane and at different angles to the horizontal so that at the point of interception of the various angularly projected light beams and lines all of the coincident projected lines and light beams will coincide, placing the object to be reproduced at the point of interception of the projected lines and light rays, adjusting the position of the object to be reproduced so that shadows of projecting parts of the object produced by the downwardly angled light rays will be overlapped by the upwardly projected light rays, photographing said object from different angles and thereby producing negatives with the projected lines thereon, removing said projected light rays from the object, backlighting said object from each side and lighting it from above by unobstructed light rays, photographing the object to produce plain negatives corresponding to the lined negatives previously taken, making photographic patterns from the lined negatives, making plates from said patterns having the line contours of the object as provided on the pattern, finally assembling the plates to reproduce the object and using the plain negatives to reproduce the hair and eyes of the object.

7. In a photo sculptural reproducing apparatus, the combination of a plurality of light projectors all arranged in the same vertical plane and angularly disposed in different horizontal planes so that light rays projected therefrom will be intersected at a predetermined point, a support for an article to be reproduced located adjacent to the point of intersection of the projected light rays, means for adjusting said support to bring an object thereon into the light rays at their point of intersection, and a plurality of cameras disposed in spaced relation about said support.

8. In a photo sculptural reproducing apparatus, the combination of a plurality of light projectors all arranged in the same vertical plane and angularly disposed in different horizontal planes so that light rays projected therefrom will be intersected at a predetermined point, a support for an article to be reproduced located adjacent to the point of intersection of the projected light rays, means for adjusting said support to bring an object thereon into the light rays at their point of intersection, and a plurality of cameras disposed in spaced relation about said support, and screens positioned in the path of said light rays and arranged to project alternate parallel lines and light spaces.

9. In a photo sculptural reproducing apparatus, the combination of a plurality of light projectors all arranged in the same vertical plane and angularly disposed in different horizontal planes so that light rays projected therefrom will be intersected at a predetermined point, a support for an article to be reproduced located adjacent to the point of intersection of the projected light rays, means for adjusting said support to bring an object thereon into the light rays at their point of intersection, a plurality of cameras disposed in spaced relation about said support, and screens positioned in the path of said light rays and arranged to project alternate parallel lines and light spaces, said light projectors arranged relative to each other so that the alternate lines and light spaces provided by the projection of light rays through a screen from one of the projectors will coincide with the corresponding lines and light rays projected by the other projectors at the point of intersection of the light rays.

10. In a photo sculptural reproducing apparatus, the combination of a plurality of light projectors all arranged in the same vertical plane and angularly disposed in different horizontal planes so that light rays projected therefrom will be intersected at a predetermined point, a support for an article to be reproduced located adjacent to the point of intersection of the projected light rays, means for adjusting said support to bring an object thereon into the light rays at their point of intersection, a plurality of cameras disposed in spaced relation about said support, one of said cameras being disposed in the same vertical plane as said light projectors.

11. In a photo sculptural reproducing apparatus, the combination of a plurality of light projectors all arranged in the same vertical plane and angularly disposed in different horizontal planes so that light rays projected therefrom will be intersected at a predetermined point, a support for an article to be reproduced located adjacent to the point of intersection of the projected light rays, means for adjusting said support to bring an object thereon into the light rays at their point of intersection, and a plurality of cameras disposed in spaced relation about said support, one of said cameras being centrally disposed and in the same vertical plane as said light projectors, certain other of said cameras being disposed at right angles to said central camera, and light projecting apparatus positioned in close proximity to said other cameras for backlighting an object on said support.

12. In a photo-sculptural reproducing apparatus, the combination of a plurality of light projectors all arranged in the same vertical plane and angularly disposed in different horizontal planes so that light rays projected therefrom will be intersected at a predetermined point, a support for an article to be reproduced located adjacent to the point of intersection of the projected light rays, means for adjusting said support to bring an object thereon into the light rays at their point of intersection, a plurality of cameras disposed in spaced relation about said support, one of said cameras being centrally disposed and in the same vertical plane as said light projectors, a view finder comprising an image inlet and an image reflection plate arranged in the same vertical plane as said light projectors and said central camera, and a second view finder embodying a reflector plate and an image inlet, the reflector plate of said second view finder being disposed in close proximity to the reflector plate to the first view finder and having its image-receiving inlet disposed at right angles to the image-receiving inlet of the first view finder and in proximity to one of said certain cameras.

13. In a photo sculptural reproducing apparatus, the combination of a plurality of light projectors all arranged in the same vertical plane and angularly disposed in different horizontal planes so that light rays projected therefrom will be intersected at a predetermined point, a support for an article to be reproduced located adjacent to the point of intersection of the projected light rays, means for adjusting said support to bring an object thereon into the light rays at their point of intersection, a plurality of cameras disposed in spaced relation about said support, one of said cameras being centrally disposed and in the same vertical plane as said light projectors, a view finder comprising an image inlet and an image reflection plate arranged in the same vertical plane as said light projectors and said central camera, and a second view finder embodying a reflector plate and an image inlet, the reflector plate of said second view finder being disposed in close proximity to the reflector plate to the first view finder and having its image-receiving inlet disposed at right angles to the image-receiving inlet of the first view finder and in proximity to one of said certain cameras, and control means for controlling adjustment of said support from a point in close proximity to the reflection plate of said view finder.

14. In a photo sculptural reproducing apparatus, the combination of a plurality of light projectors all arranged in the same vertical plane and angularly disposed in different horizontal planes so that light rays projected therefrom will be intersected at a predetermined point, a support for an article to be reproduced located adjacent to the point of intersection of the projected light rays, means for adjusting said support to bring an object thereon into the light rays at their point of intersection, a plurality of cameras disposed in spaced relation about said support, one of said cameras being centrally disposed and in the same vertical plane as said light projectors, certain other of said cameras being disposed at right angles to said central camera, and light projecting apparatus positioned in close proximity to said other cameras for backlighting an object on said support, and means for automatically operating all of said cameras simultaneously.

15. In a photo sculptural reproducing apparatus, the combination of a plurality of light projectors all arranged in the same vertical plane and angularly disposed in different horizontal planes so that light rays projected therefrom will be intersected at a predetermined point, a support for an article to be reproduced located adjacent to the point of intersection of the projected light rays, means for adjusting said support to bring an object thereon into the light rays at their point of intersection, a plurality of cameras disposed in spaced relation about said support, and screens positioned in the path of said light rays and arranged to project alternate parallel lines and light spaces, said light projectors arranged relative to each other so that the alternate lines and light spaces provided by the projection of light rays through a screen from one of the projectors will coincide with the corresponding lines and light rays projected by the other projectors at the point of intersection of the light rays, a view finder comprising an image reflection plate and an image inlet, and control means for controlling adjustment of said support from a point in close proximity to the reflector plate of said view finder, and means for automatically operating all of said cameras simultaneously.

CHUNG LING.